US009583258B2

(12) United States Patent
Noe et al.

(10) Patent No.: US 9,583,258 B2
(45) Date of Patent: Feb. 28, 2017

(54) DEVICE FOR LIMITING CURRENT HAVING VARIABLE COIL IMPEDANCE

(75) Inventors: Mathias Noe, Schauenburg (DE); Christian Schacherer, Niederrohrdorf (CH)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 393 days.

(21) Appl. No.: 13/577,272

(22) PCT Filed: Dec. 21, 2010

(86) PCT No.: PCT/EP2010/007837
§ 371 (c)(1), (2), (4) Date: Aug. 6, 2012

(87) PCT Pub. No.: WO2011/095199
PCT Pub. Date: Aug. 11, 2011

(65) Prior Publication Data
US 2012/0306606 A1 Dec. 6, 2012

(30) Foreign Application Priority Data
Feb. 6, 2010 (DE) ........................ 10 2010 007 087

(51) Int. Cl.
*H01F 27/02* (2006.01)
*H01F 38/02* (2006.01)
(Continued)

(52) U.S. Cl.
CPC ........... *H01F 38/023* (2013.01); *H01F 27/02* (2013.01); *H01F 27/08* (2013.01); *H01F 2006/001* (2013.01)

(58) Field of Classification Search
CPC ............................................ H01F 27/00–27/30
(Continued)

(56) References Cited

U.S. PATENT DOCUMENTS 3,256,464 A * 6/1966 Stauffer .................... H01F 6/02 174/15.4
3,443,255 A * 5/1969 Massar ..................... H01F 6/02 323/360
(Continued)

FOREIGN PATENT DOCUMENTS

DE 19524579 A1 1/1997
DE 19628358 C1 1/1998
(Continued)

OTHER PUBLICATIONS

Usoskin, et al., Inductive Fault Current Limiters: Kinetics of Quenching and Recovery, IEEE Transactions on Applied Superconductivity, 20090601 IEEE Service Center, Los Alamitos, CA, US, Vol:19, Nr:3, pp. 1859-1862.
(Continued)

*Primary Examiner* — Tuyen Nguyen
(74) *Attorney, Agent, or Firm* — Leydig, Voit & Mayer, Ltd.

(57) ABSTRACT

A device for limiting current with variable coil impedance includes a choke coil and a cooling device. An additional coil is made of a high-temperature superconducting material and is disposed in the choke coil such that the current is limited by the device without using an iron core.

10 Claims, 1 Drawing Sheet

(51) Int. Cl.
*H01F 27/08* (2006.01)
*H01F 6/00* (2006.01)

(58) Field of Classification Search
USPC ......... 335/216, 297–299; 336/DIG. 1, 55–62
See application file for complete search history.

(56) References Cited

U.S. PATENT DOCUMENTS

| | | | | | |
|---|---|---|---|---|---|
| 3,486,079 | A | * | 12/1969 | Arp | H01F 6/003 335/216 |
| 3,629,690 | A | * | 12/1971 | Massar | H01F 6/02 327/527 |
| 5,105,098 | A | * | 4/1992 | Gattozzi | H03K 17/92 327/366 |
| 5,414,586 | A | * | 5/1995 | Hara et al. | 361/19 |
| 5,436,606 | A | * | 7/1995 | Cottevieille et al. | 335/216 |
| 6,016,094 | A | | 1/2000 | Gerhold | |
| 7,180,396 | B2 | | 2/2007 | Bock et al. | |
| 7,558,030 | B2 | * | 7/2009 | Lee | H02H 9/023 361/19 |

FOREIGN PATENT DOCUMENTS

| | | | | |
|---|---|---|---|---|
| DE | 602004012035 | T2 | | 3/2009 |
| EP | 1590866 | B1 | | 1/2007 |
| FR | 2691591 | A1 | | 11/1993 |
| JP | 5275757 | A | | 10/1993 |
| JP | 11089085 | A | * | 3/1999 |
| JP | 2001069665 | A | | 3/2001 |
| SU | 489176 | | * | 2/1976 |

OTHER PUBLICATIONS

European Patent Office, International Search Report in International Patent Application No. PCT/EP2010/0007837 (Apr. 26, 2011).

* cited by examiner

DEVICE FOR LIMITING CURRENT HAVING VARIABLE COIL IMPEDANCE

CROSS-REFERENCE TO PRIOR APPLICATIONS

This application is a U.S. National Phase application under 35 U.S.C. §371 of International Application No. PCT/EP2010/007837, filed on Dec. 21, 2010, and claims benefit to German Patent Application No. DE 10 2010 007 087.4, filed on Feb. 6, 2010. The International Application was published in German on Aug. 11, 2011 as WO 2011/095199 under PCT Article 21(2).

FIELD

The present invention relates to a device for limiting current with variable coil impedance.

BACKGROUND

Current limiters find widespread use in energy technology and in electric power production. In energy technology in general and in high-voltage technology in particular, the most well-known current limiters are those that function using choke coils according to the principle of the shielded iron core or of the direct current pre-magnetized iron core. A drawback of current limiters that make use of iron cores is that they are characterized by a high volume and great weight, as well as by the relatively high impedance of the electric system during operation at nominal value.

Current limiters referred to as $I_s$ limiters are also known. The advantage of these $I_s$ limiters is that the impedance during normal operation is negligible low, but can be abruptly increased in case of a fault. This can be achieved by employing detonating caps. A drawback of this system, however, is that the use of detonating caps calls for a maintenance procedure every time they are triggered, and that it can only be scaled to a limited extent for applications in high-voltage technology.

Another approach is the use of superconducting materials. German specification DE 60 2004 012035 describes, for example, a superconducting current limiter with a magnetic field-assisted quench. In case of a fault, the current flowing through the superconductor gives rise to a critical current and the superconductor switches over to the normal-conductive state. According to the current limiter disclosed in German specification DE 60 2004 012035, each superconductor element is connected in parallel to a coil.

Another known principle is that of the so-called resistive superconducting current limiters whose non-linear current-voltage line limits the current in case of a short circuit. A drawback of the two latter principles is that the power has to be supplied by means of suitable means between a room-temperature environment and a low-temperature environment. This causes high thermal losses.

SUMMARY

In an embodiment, the present invention provides a device for limiting current with variable coil impedance including a choke coil and a cooling device. An additional coil is made of a high-temperature superconducting material and is disposed in the choke coil such that the current is limited by the device without using an iron core.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
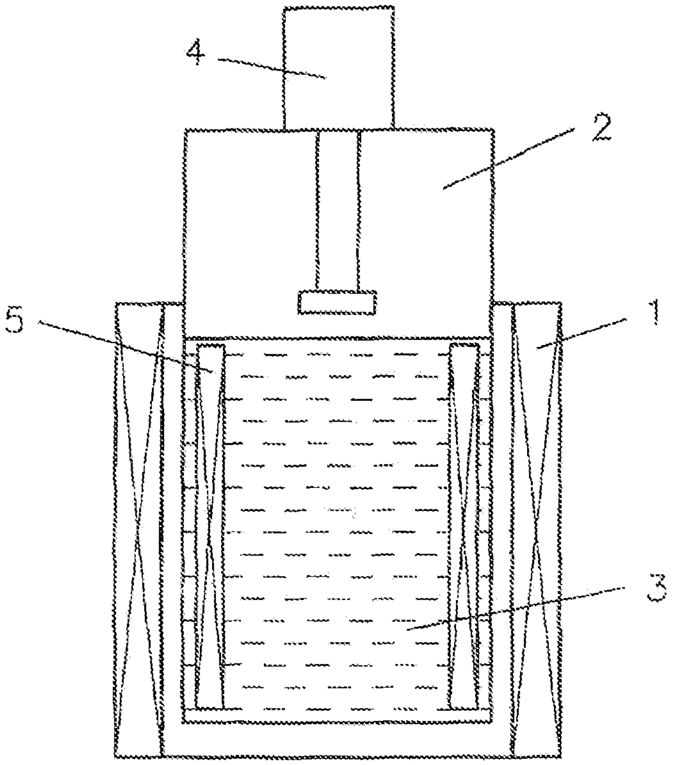
FIG. 1 shows an overview diagram of an arrangement comprising a choke coil with an installed high-temperature superconductor (HTS) coil and a cooling device according to an embodiment of the invention.

In an embodiment, the invention provides a current limiter that avoids the above-mentioned restrictions and drawbacks. In particular, an embodiment of the invention provides a current limiter that limits the current quickly and reliably in case of a fault, that automatically returns to the normal state, and that increases the impedance during operation at nominal value only to a negligible extent. It should also be possible to use the current limiter in combination with the widely employed choke coils and for retrofitting into existing networks.

In an embodiment, the invention provides a current limiter in which, through the use of a superconducting coil inside a choke coil, the inductance and thus the impedance of the choke coil are significantly reduced. This is done by means of currents that are induced in the superconducting coil and that compensate for the magnetic field of the choke coil.

The choke coil of the current limiter according to an embodiment of the invention comprises a sealed cryostat that has no electric connection to its surroundings. Inside the cryostat, there is a short-circuited coil that is made of a superconducting material. This coil comprises one or more short-circuited windings, each winding consisting of at least one short-circuited turn. One embodiment comprises a superconducting coil that consists of only one short-circuited turn. In a preferred embodiment, the short-circuited coil consists of a commercially available superconducting flat-strip conductor.

During normal operation, the superconducting coil compensates for the magnetic field of the choke coil. As a result, the inductance is lowered and the voltage drop during normal operation is minimized. If a certain current value is exceeded in the superconducting coil, the superconductor switches over to the normal-conductive state and increases the inductance, as a result of which the current is limited. After the excessively high current has been switched off, the superconductor automatically switches back to the superconducting state after a short period of time and normal operation can be resumed.

An advantage of the current limiter according to the invention is its intrinsic safety due to the material properties of the superconductor. This means that there is no need for additional triggering mechanisms.

A special advantage is that no iron core is needed in order to effectively limit the current, which has an advantageous effect on the impedance of the system and also on the dimensioning of the component. Dispensing with iron cores allows the current limiter to have a compact construction so that it can be installed in existing network systems. In this manner, the conventional measures for limiting current with a choke coil can be configured more efficiently. This is achieved at the time of the initial set-up of new energy networks with a short-circuited superconducting coil in order to reduce the impedance during operation at nominal value and also when existing networks are retrofitted.

Another advantage of an embodiment of the invention is that no means are needed for supplying current to the superconducting coil. Therefore, the cryostat can be configured as a sealed system, thus avoiding the thermal losses that normally occur in electric connections between an environment at room temperature and a low-temperature environment.

FIG. 1 schematically shows an arrangement consisting of a choke coil 1, a cryostat 2 that is filled with liquefied nitrogen 3, a cooling device 4 and an HTS coil 5.

In this embodiment, the HTS coil 5 is configured as a YBCO flat-strip conductor having a winding, this winding being short-circuited. Moreover, the HTS coil 5 is arranged in a cryostat 2, and a cooling device 4 cools the nitrogen that is inside said cryostat 2 and that surrounds the HTS coil. This is how the superconducting properties of the HTS coil 5 are created.

Figure 2:
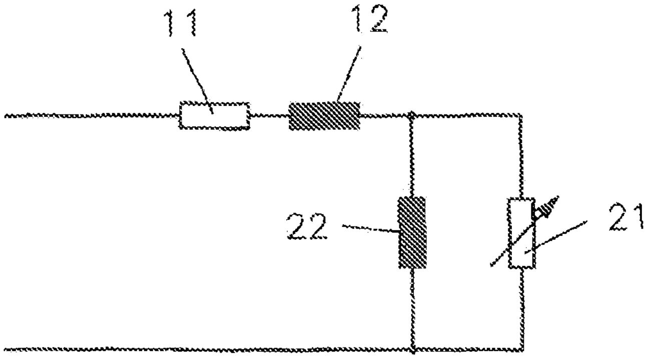
FIG. 2 shows an equivalent circuit diagram of a choke coil with an installed HTS coil.

FIG. 2 shows the equivalent circuit diagram of a choke coil 1 with an ohmic resistance 11 and a leakage inductance 12, and with an installed HTS coil 5 that has a variable impedance 21. The entire arrangement of the coils has the main inductance 22. During normal operation, the short-circuited HTS coil 5 compensates for the magnetic field of the choke coil 1. Due to this compensation, the inductance is lowered and the losses of the system during normal operation are minimized. In contrast, if a short circuit occurs, the HTS coil 5 switches over to the normal-conductive state. The magnetic field of the choke coil 1 is no longer compensated for and as a result, the inductance rises. The short-circuit current is thus limited. When the short-circuit current stops, the HTS coil 5 returns to the superconducting state after a few seconds and normal operation is resumed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

LIST OF REFERENCE NUMERALS

1 choke coil
2 cryostat
3 liquefied nitrogen
4 a cooling device 4
5 HTS coil
11 ohmic resistance of the choke coil
12 primary leakage inductance of the choke coil
21 variable impedance of the superconducting coil
22 main inductance of the arrangement

The invention claimed is:

1. A device for limiting current with variable coil impedance, comprising:
- a choke coil;
- a cooling device including a cryostat configured as a sealed system; and
- an additional coil that is made of a high-temperature superconducting material and is not electrically connected to the choke coil, the additional coil being disposed in the choke coil such that the current is limited by the device without using an iron core,
- wherein the cryostat does not include means for the electric connection of the additional coil to an electric environment.

2. The device according to claim 1, wherein the additional coil is disposed inside the cryostat.

3. The device according to claim 1, wherein the additional coil includes at least one short-circuited turn.

4. The device according to claim 1, wherein the additional coil is electrically short-circuited.

5. The device according to claim 1, wherein the additional coil is configured to have currents induced therein that compensate for the magnetic field of the choke coil and thereby reduce the inductance and impedance of the choke coil.

6. The device according to claim 5, wherein the additional coil is configured to switch to a normal-conductive state in response to a short circuit and thereby cease to compensate for the magnetic field of the choke coil.

7. The device according to claim 6, wherein, after switching to a normal-conductive state, the additional coil is configured to switch to a superconducting state.

8. The device according to claim 1, wherein the additional coil that is made of a high-temperature superconducting material is a flat-strip conductor having a winding.

9. The device according to claim 8, wherein the flat-strip conductor comprises a rare earth element.

10. The device according to claim 8, wherein the flat-strip conductor comprises YBCO.

* * * * *